July 31, 1928.
J. E. LOVELY
1,679,043
AUXILIARY GROOVING OR FACING ATTACHMENT FOR FAY LATHES
Filed March 21, 1924   6 Sheets-Sheet 1
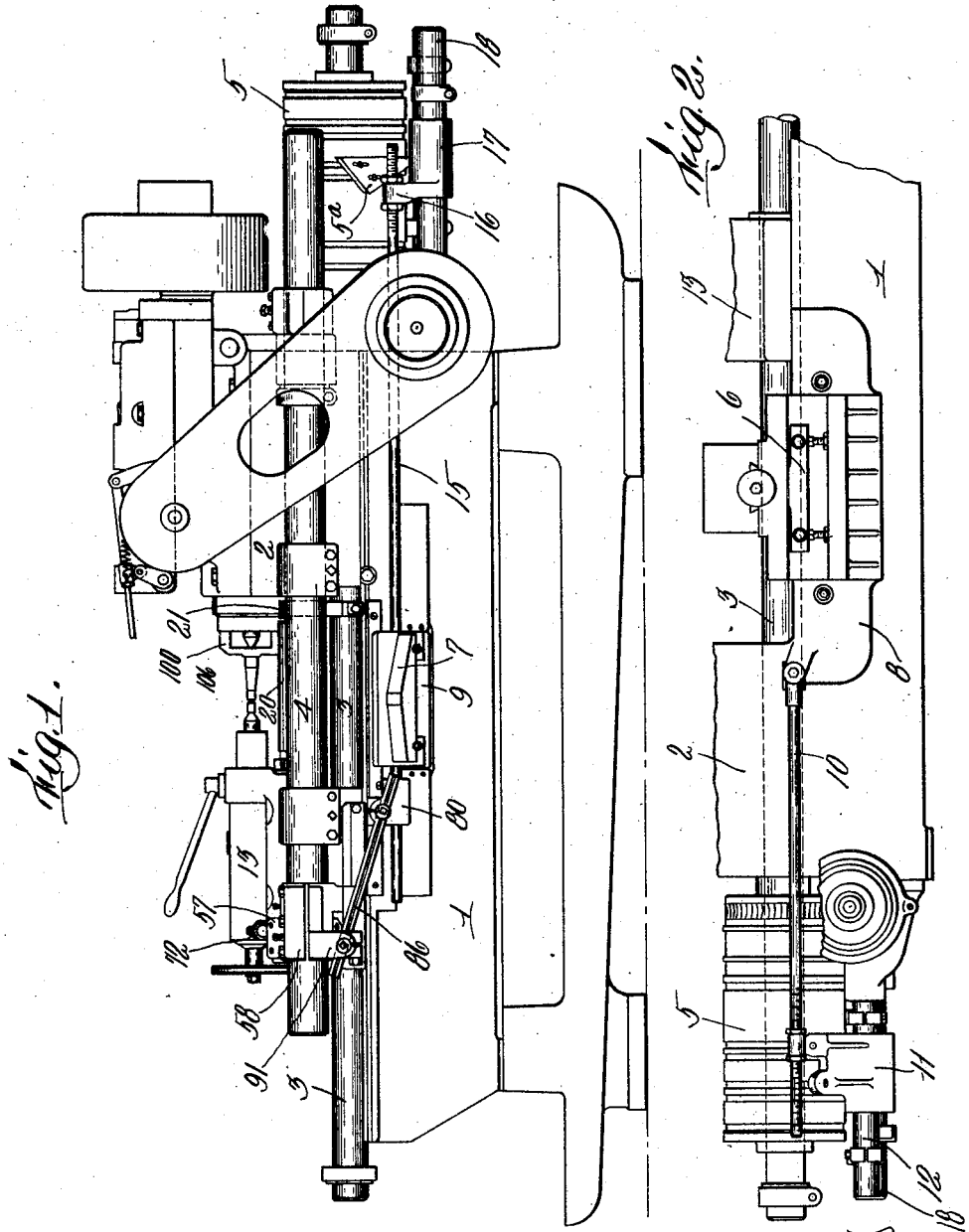
Inventor
John E. Lovely
by Wright, Brown, Quinby & May
Attys.

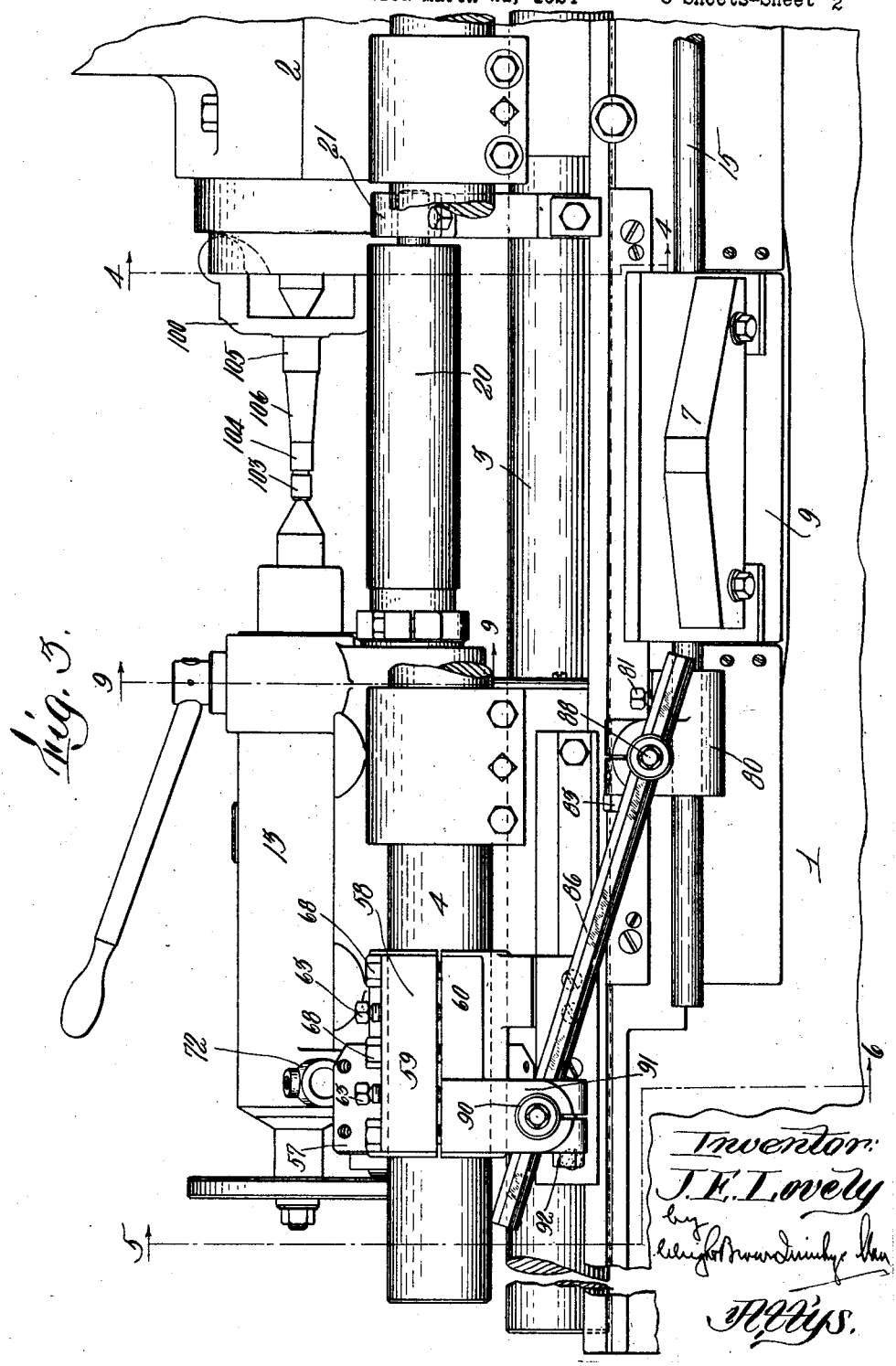

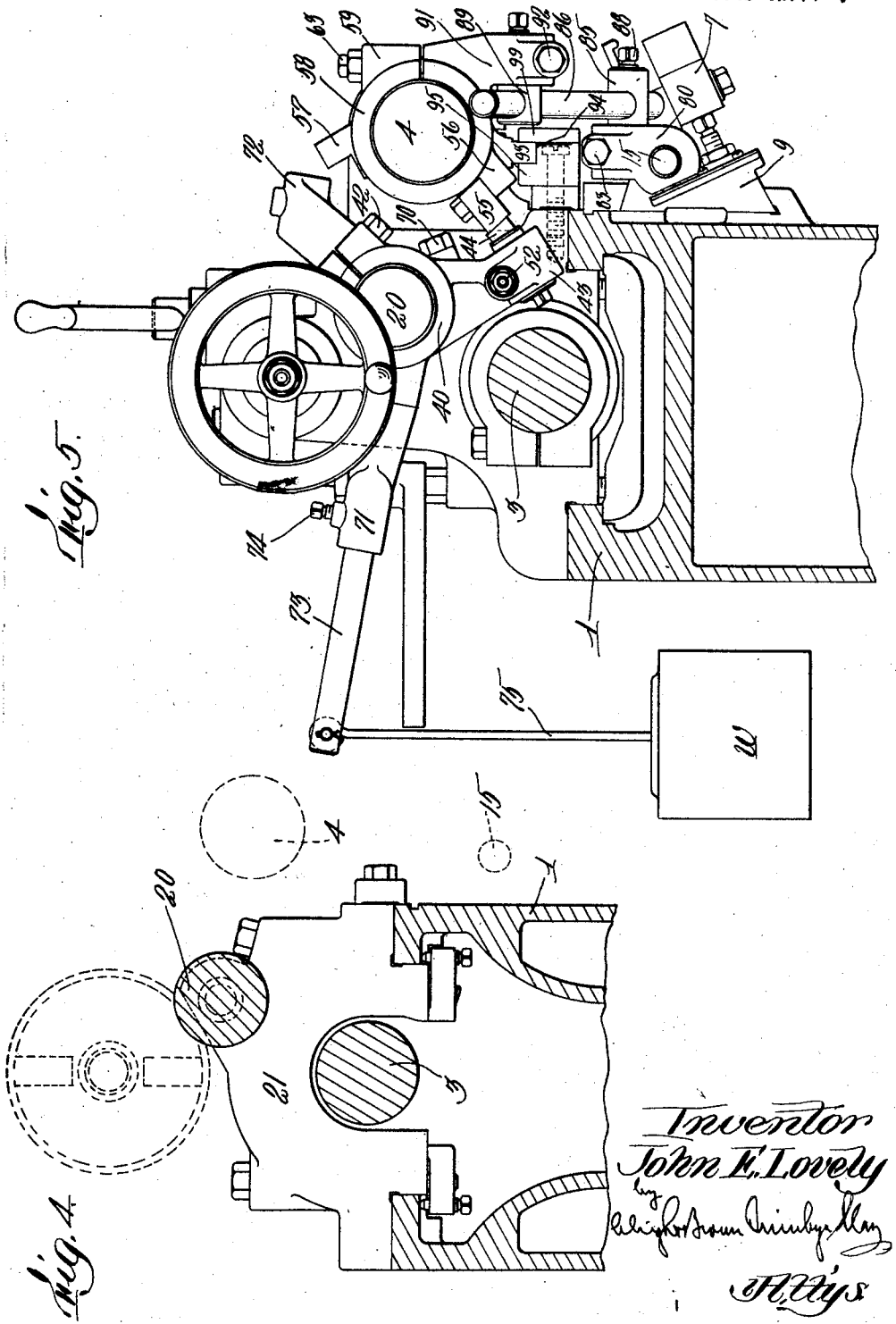

July 31, 1928.
J. E. LOVELY
1,679,043
AUXILIARY GROOVING OR FACING ATTACHMENT FOR FAY LATHES
Filed March 21, 1924
6 Sheets-Sheet 4
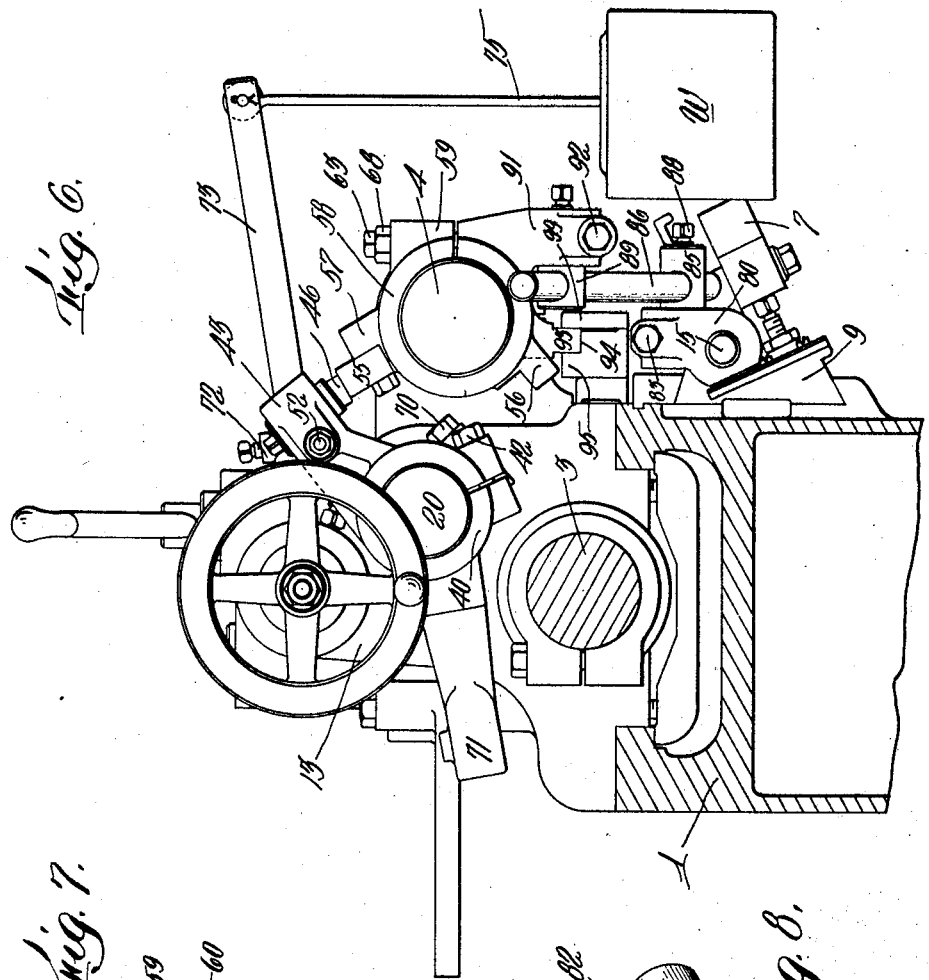
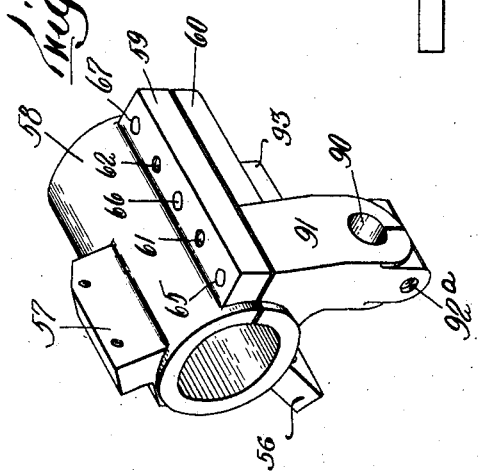
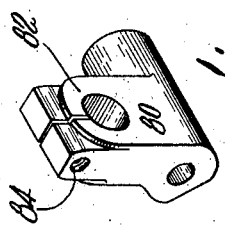
Inventor
John E. Lovely July 31, 1928.
J. E. LOVELY
1,679,043
AUXILIARY GROOVING OR FACING ATTACHMENT FOR FAY LATHES
Filed March 21, 1924      6 Sheets-Sheet 5
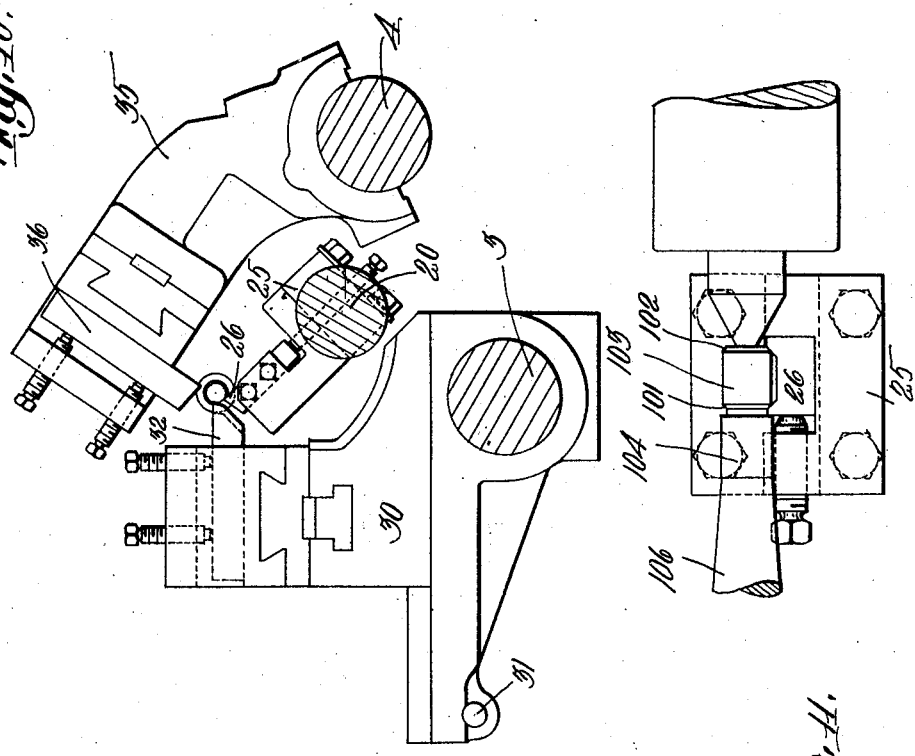
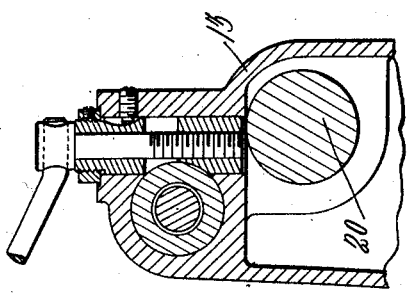
Inventor
John E. Lovely July 31, 1928.

J. E. LOVELY 1,679,043

AUXILIARY GROOVING OR FACING ATTACHMENT FOR FAY LATHES

Filed March 21, 1924    6 Sheets-Sheet 6

Inventor
John E. Lovely
by
Attys

Patented July 31, 1928.

1,679,043

UNITED STATES PATENT OFFICE.

JOHN E. LOVELY, OF SPRINGFIELD, VERMONT, ASSIGNOR TO JONES & LAMSON MACHINE COMPANY, OF SPRINGFIELD, VERMONT, A CORPORATION OF VERMONT.

AUXILIARY GROOVING OR FACING ATTACHMENT FOR FAY LATHES.

Application filed March 21, 1924. Serial No. 700,819.

This invention relates to an attachment for the well known Fay lathe for carrying and controlling a facing or grooving tool in addition to such tools as may be carried and controlled by the usual mechanisms. The Fay lathe makes use of one or more rockable and longitudinally slidable bars below and to the rear of the work for carrying tool holders and traversable formers or carriers for controlling the rocking thereof.

According to this invention a guide bar which may be one of these tool bars is made use of to slidably carry a member by which the position of a rocking tool holder for supporting grooving or facing tools may be controlled, the controlling member being moved along the bar by cam controlled means.

For a more complete understanding of this invention reference may be had to the accompanying drawings in which Figure 1 is a rear elevation of a Fay lathe showing the auxiliary attachment in position thereon, the rear tool holder being removed.

Figure 2 is a fragmentary front elevation of the machine.

Figure 3 is a view similar to a portion of Figure 1, but drawn to a larger scale.

Figure 4 is a detail section on line 4—4 of Figure 3.

Figures 5 and 6 are detail sections on the line 5—6 of Figure 3, but showing parts in different positions.

Figures 7 and 8 are perspectives of the tool control slide and an actuating clamping element, respectively.

Figure 9 is a detail section on line 9—9 of Figure 3.

Figure 10 is a sectional detail showing the relation of the several tools and carriers to the work.

Figure 11 is an enlarged detail in plan of one form of attachment tool in operative relation to the work.

Figure 12:
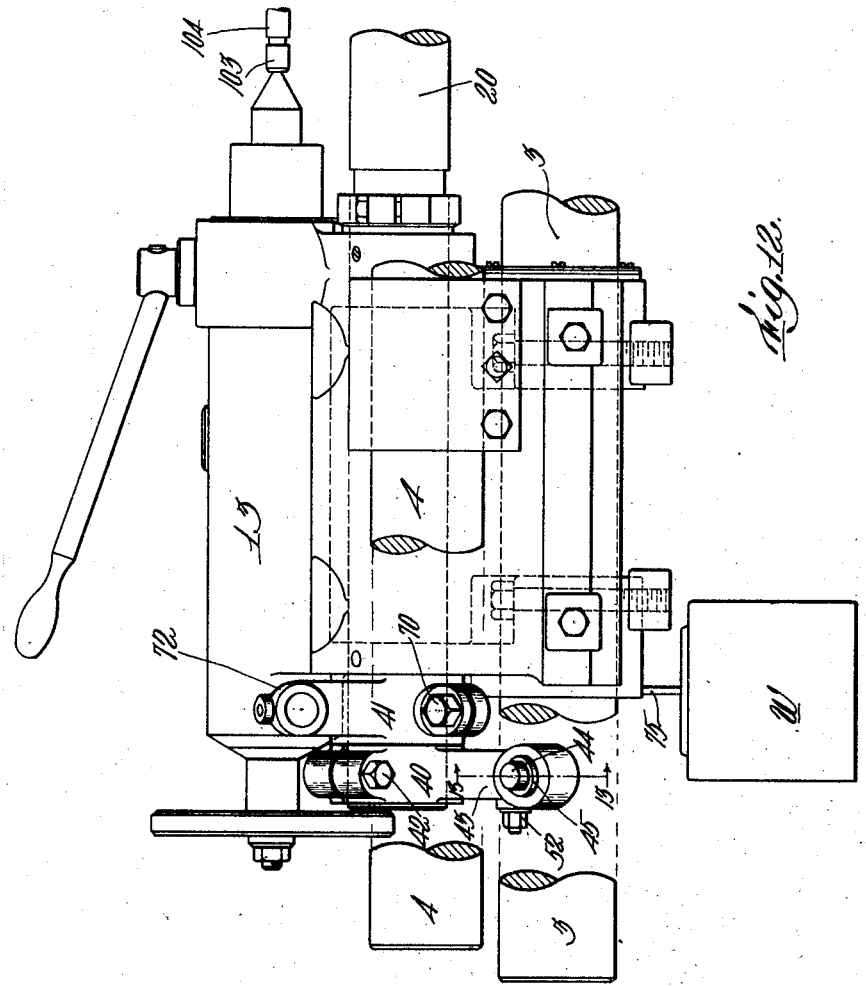
Figure 12 is a fragmentary rear elevation with parts broken away of the tailstock portion of the machine.

At 1 is shown the bed of the machine carrying a headstock 2 at one end and a tailstock 13 movable axially from and toward the headstock in the usual manner. At 3 is shown a tool supporting bar slidable through the headstock beneath the work and at 4 is shown a similar bar to the rear of the machine and above the bar 3. Both these bars are rockable as well as slidable and are designed to carry tools for operating on work positioned between the head and tailstocks. At 5 is shown the usual cam drum to the periphery of which may be attached cam pieces as shown at 5ª in Figure 1, these cam pieces controlling the longitudinal positions of the bars 3 and 4. Cams on this drum also control the longitudinal position of formers or cams 6 and 7 supported on traversing carriages 8 and 9 at the front and rear faces of the machine, the forward carriage 8 being fixed to the end of a rod 10 adjustably supported at its opposite end in a slide 11 guided for longitudinal movement on a bar 12, the slide 11 carrying the usual cam follower by which the position of the cam 6 may be controlled. The carriage 9 may be clamped to a similar rod 15, one end of which is adjustably fixed as at 16 to the slide 17 mounted for movement axially of the bar 18. This slide 17 also carries a cam follower by which its position lengthwise of the bar 18 may be controlled from a cam on the drum 5. The cams or formers 6 and 7 control the angular position of the bars 3 and 4, the axial position of these formers being controlled from cams on the drum 5 in the well known manner.

According to the present invention the tailstock 13, as shown best in Figure 9, has journaled therein a rocking shaft or bar 20, this shaft extending parallel to the bars 3 and 4 and projecting toward the headstock end of the lathe where it may be supported in case it is sufficiently long to need support in a bearing 21 carried by the frame 1. In case the rock shaft or bar 20 is short no bearing 21 may be found necessary. Fixed to this bar 20 is a tool carrier 25 carrying the tool 26 for facing or grooving work which bears against the work with relation to the other tools as best illustrated in Figure 10. Referring to this figure, 30 indicates the tool carriage carried by the bar 3 and carrying the tools 32 and at 31 is indicated a pin for attachment of a follower for the front cam or former 6. At 35 is indicated the tool carriage carried by the bar 4 and carrying the tool 36.

Figure 13:
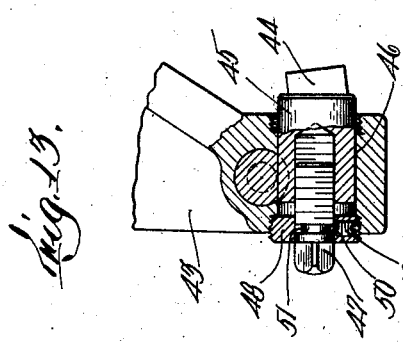
Figure 13 is a detail section on line 13—13 of Figure 12.

The rockable bar 20 extends rearwardly of its bearing in the tailstock 13, as shown best in Figure 12, and to the rear end thereof is fixed a pair of split collars 40 and 41. The collar 40 may be clamped to the bar 20 by means of a bolt 42 passing through its split portions and this collar has an arm 43 extending therefrom in the end of which is adjustably fixed a cam follower block 44. As shown at Figure 13 this block 44 may have a cylindrical portion 45 slidable within a perforation 46 in the end of the arm 43, the portion 45 having a central threaded perforation for the mating threaded end of an adjusting bolt 47. This bolt 47 passes through an externally threaded collar 48, and a set screw 49 having a reduced extremity 50 fitting within a groove 51 in the bolt is threaded through the side of this collar. The collar 48 is threaded into one end of the perforation 46. The extremity 43 is provided with a clamping bolt 52 by which the follower may be fixed in adjusted position. The cam follower block 44 is adapted to ride on a cam or former 55 which may be fixed to one or the other of a pair of lugs 56 and 57 extending outwardly from a carrier sleeve 58 which may be slidably carried by the tool bar 4. This carrier 58 may be adjusted to fit the bar 4 snugly but with capability of sliding thereon and for this purpose it is formed split with a pair of mating flanges 59 and 60 at adjacent ends of the split portion. The flange 59 is threaded as at 61 and 62 for the reception of adjusting bolts 63 (see Figure 3), the lower ends of which impinge on the upper face of the flange 60. The flange 59 is also perforated as at 65, 66 and 67 for the reception of tightening bolts 68 which pass through the flange 59 and are threaded into the flange 60. By adjustment of these several bolts the amount to which the flanges 59 and 60 are brought together may be accurately fixed to preserve the desired degree of freedom for sliding of the carrier 58 on the bar 4. The cam follower 44 may be held into engagement with the former or cam 55 and for this purpose the collar 41 is provided. This collar is formed split so as to be clamped to the bar 20 by means of a clamping bolt 70 and is provided with a pair of angularly disposed outwardly extending arms 71 and 72. These arms are perforated for the reception of one end of a rod 73 which may be placed in either perforation selectively and may be fixed therein as by means of a set screw 74. To the outer end of this rod 73 is connected as by means of a hanger 75 a weight W. As shown in Figure 5 the weight acts on the arm 71 so that the cam follower 44 is held against the cam 55 fixed to the lug 56, while in Figure 6 the weight W is carried by the arm 72 so that the shaft 20 is rocked into position to bring the cam follower 54 against the cam 55 carried by the lug 57. The cam follower 44 is reversible end to end in the arm 43. This construction is for the purpose of providing that the facing or grooving tool may be brought against the work from beneath when the arrangement of Figure 5 is employed or from above when the arrangement in Figure 6 is employed, Figure 10 showing the arrangement when it is brought from beneath, both arrangements being provided so that that one may be chosen which best suits the particular work being operated upon.

The rocking position of the bar 20 to control the presentation and withdrawal of the tools from the work is controlled by the longitudinal position of the carrier 58 on the bar 4 and for the purpose of determining this position this carrier may be attached to the rod 15 to which may be fixed the rear former 7. This rear former may be clamped to the rod or disconnected therefrom, depending on the particular control desired for the rear tool carriage.

For the purpose of connecting the rod 15 to the carrier 58 means shown best in Figures 1, 3, 5 and 6 has been provided. Referring to these Figures, at 80 is a collar, shown detached in Figure 8, which may be fixed to the rod 15 by means of a set screw 81. This collar 80 has an upstanding split lug 82, the split portions of which may be brought together by means of a bolt 83 passing loosely through one portion and threaded into aperture 84 in the other. The split portions are thus adapted to be clamped against a short shaft 85 which is perforated transverse of its axis for the reception of a rod 86. This rod 86 as shown, is formed circular in cross section with one side flattened and against this flat side may engage the inner end of a tightening bolt 88 by which the rod 86 may be fixed in longitudinal relation therein. This rod 86 also passes through a similar short shaft 89 passed through a perforation 90 in the lower end of an arm 91 depending from one end of the flange 60 of the carrier 58. This arm 91 is split at its lower end so that the shaft 89 may be clamped within the perforation 30 by means of a bolt 92 passing loosely through one portion and threaded into opening 92ª in the other portion of the split extremity. This mounting of the rod 86 permits it to be adjusted angularly with relation to the members 58 and 80, these members being of any desired distance apart. The cam carrier 58 is prevented from rocking during its traverse by means of a downwardly extending lug 93 thereon which rides in a guideway 94 formed in a block 95 fixed to the tailstock and provided with a cover plate 96 on its outer face.

It will thus be seen that by moving the rod 15 axially, the carrier 58 is moved axially of the tool bar 4 and that through this motion rocking of the bar 20 is effected by engagement between the former or cam 55 carried by the carrier 58 and the follower 44 carried by the collar 40. The rocking of the bar 20, therefore, acts to bring the tool holder with the tool 26 from and toward the work.

As illustrated in Figures 1, 3 and 11 by way of example the work to be turned comprises an automobile steering gear yoke shown at 100. The tool 26 may be brought up against the work as shown in Figure 11 to cut the beveled portions 101 and 102 adjacent the end thereof while at the same time tools carried and controlled in the usual way may be employed to operate on other portions thereof, spaced tools in the forward carriage cutting the cylindrical portions 103, 104 and 105, and tools in the back carriage as at 36 cutting the tapered portion 106. In this set up the cam 6 at the front of the carriage is formed to hold the bar 3 against rotation and the cam 7 at the back of the machine may be disconnected from the rod 15 and fixed to the machine frame in order to cause the rear bar 4 to be rocked as it traverses so that the tool carried thereby shall cut the taper 106. Of course should it be desired, the former 7 may be fixed to the rod 15 to control the rocking of the rear tool holder and its bar 4. It is also apparent that the sliding carrier 58 might be mounted on other than the tool bar 4 should it be so desired, though this tool bar is conveniently located for this purpose. So far as the carrier 58 is concerned the bar 4 is merely a sliding guide, the bar 4 itself being rocked or traversed, or both, independently of the carrier in accordance with the motion which it is desired to impart to the tools of the tool carriage fixed thereto.

Having thus described an embodiment of this invention it should be evident to those skilled in the art that various changes and modifications might be made therein without departing from its spirit or scope as defined by the appended claims.

I claim:

1. The combination with a lathe having a headstock and a tailstock, a rockable and axially movable tool bar, and a cam drum having cam means for controlling the axial position of said tool bar, of an auxiliary tool bar journaled for rocking movement in one of said stocks, a cam carrier slidable on said first mentioned tool bar, a cam follower carried by said auxiliary bar, means for holding said follower against said cam, and cam means on said drum for sliding said cam carrier.

2. The combination with a lathe, tool holders, a cam drum having cams thereon by which the movements of said holders are controlled, and a guide bar, of a rocking tool bar, a cam carrier slidable on said guide bar, a cam on said carrier, a follower for said cam carried by said tool bar, and means on said cam drum for controlling the position of said cam carrier to thereby control the angular position of said tool bar.

3. The combination with a lathe having a reciprocable and rockable tool bar, of a carrier slidable on said bar, a cam on said carrier, means to prevent rocking of said cam carrier, a rockable tool holder having a follower engageable with said cam to be rocked thereby on sliding of said cam carrier, means for holding said follower against said cam, and means for sliding said cam carrier.

4. The combination with a lathe having a rockable and reciprocable tool bar, of an auxiliary rockable tool bar, a cam carrier slidable on said first mentioned tool bar, a cam on said carrier, means for preventing rocking of said carrier, a follower for said cam carried by said auxiliary bar, means to hold said follower against said cam, and means for sliding said carrier.

5. The combination with a lathe having a headstock and a tailstock, a rockable and axially movable tool bar, a cam drum having cam means for moving said tool bar axially, a cam movable parallel to said bar for controlling the rocked position of said bar, a rod to which said cam may be fixed, and cam means on said drum for moving said rod, of an auxiliary tool bar rockably supported in one of said stocks, a cam carrier for controlling the rocked position of said auxiliary bar slidable on said first mentioned tool bar, means for preventing rocking of said cam carrier, and means for connecting said carrier to said rod.

6. The combination with a lathe having head and tailstocks, of a rocking tool bar journaled in one of said stocks, a guide bar, a cam carrier slidable on said guide bar, a cam on said carrier, a follower carried by said tool bar and controlling the rocking thereof by engagement with said cam, and means for moving said carrier.

7. In a machine of the class described, a rock shaft, a tool holder rockable with said shaft from and toward work, a tool bar, a member slidable on said tool bar and having a cam thereon, a follower for said cam carried by said tool holder, and means for sliding said member.

8. The combination with a lathe having a reciprocable and rockable tool bar, and a tool carrier supported on said bar, of a rockable tool holder, a member slidable on said bar for controlling the position of said holder, and means for sliding said member.

9. In a machine of the class described, a rocking tool bar, and two tool bars mounted for rocking and axial movement, a cam drum, connections from said cam drum for rocking said first mentioned tool bar, and connections from said drum for moving axially each of said two tool bars.

10. In a machine of the class described, a rocking tool bar, and two tool bars mounted for rocking and axial movement, a cam drum, connections from said cam drum for rocking said first mentioned tool bar, connections from said drum for moving axially each of said two tool bars, and for rocking one of said two tool bars.

In testimony whereof I have affixed my signature.

JOHN E. LOVELY.